E. O. SUTTON.
ATTACHMENT FOR VEHICLES.
APPLICATION FILED AUG. 30, 1913.
1,194,256.
Patented Aug. 8, 1916.
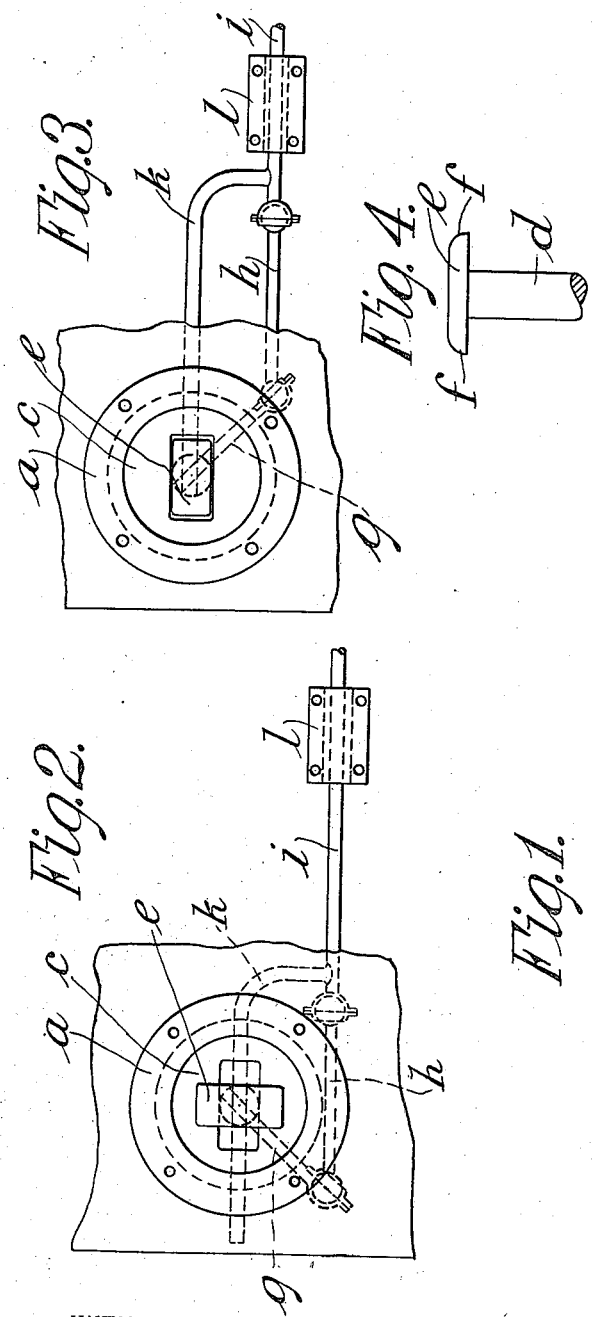
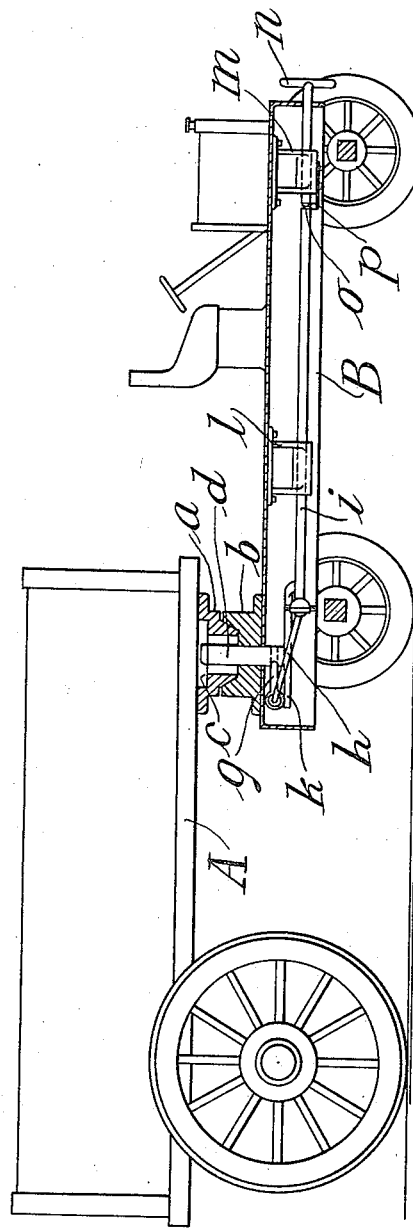
WITNESSES:
H. E. Hartwell
Sebastian Hinton
INVENTOR.
Edward O. Sutton.
BY
Chapin & Co.
ATTORNEY.

UNITED STATES PATENT OFFICE.

EDWARD O. SUTTON, OF SPRINGFIELD, MASSACHUSETTS.

ATTACHMENT FOR VEHICLES.

1,194,256.  Specification of Letters Patent.  Patented Aug. 8, 1916.

Application filed August 30, 1913. Serial No. 787,478.

*To all whom it may concern:*

Be it known that I, EDWARD O. SUTTON, a citizen of the United States, residing at Springfield, in the county of Hampden and State of Massachusetts, have invented certain new and useful Improvements in Attachments for Vehicles, of which the following is a specification.

This invention relates to vehicles in general, and more particularly to a device whereby the usual king-pin or king-bolt of such vehicles may be manipulated from a distance.

While the subject-matter of the invention is susceptible of general application and use, it is particularly useful in connection with what has come to be known as the tractor and trailer combine involving a tractor susceptible of being attached to and used in connection with several dependent trailers. In a co-pending application, Serial No. 769,884, filed May 26, 1913, I have described and disclosed a simple mechanical device whereby in this type of vehicle the two bolster-plates may be gently eased into or out of coöperative relation by means of simple backward or forward movements of the tractor relatively to the trailer, and in another co-pending case, Serial No. 787,477, filed August 30, 1913, I have extended the idea of the case first noted and added thereto a mechanism whereby forward and backward movements of the tractor relatively to the trailer may serve not only to manipulate the bolster-plates of the two vehicles, but also raise or lower the trailer to or from dumping position. In both of these inventions and before the manipulation of the rear vehicle by the fore vehicle may be effected, it is necessary to manipulate the king-bolt or king-pin of the two, and this can only be done by reaching or crawling in under the two vehicles in order to so manipulate the king-bolt.

The purpose of this present invention is to extend the idea of the other two inventions just noted and make it possible to make the entire process much more simple and readily effected by means of a device which makes it possible to manipulate the king-pin from a distance, preferably from the seat of the tractor.

In the drawings,—Figure 1 is an elevation, partly in section, of my invention and showing also, more or less diagrammatically, the tractor and the trailer; Fig. 2 is a plan view of my invention showing the king-pin in locking position; Fig. 3 is a similar view, showing the king-pin in releasing position; and Fig. 4 is a side elevation of the king-pin.

Referring to the drawings,—A diagrammatically represents the trailer and B the tractor. Upon the trailer is mounted a bolster-plate $a$ for coöperation with the bolster-plate $b$ mounted upon the tractor. In this illustration I have shown the bolster-plate $b$ of the tractor mounted upon the frame of the tractor, but it is, of course, equally possible to mount the bolster-plate $b$ of the tractor directly upon the rear axle or to support it from the rear axle by springs, as shown in my co-pending case Serial No. 769,884 hereinabove noted. The upper bolster-plate is provided with, in this instance, an oblong aperture lying along the axis of the two vehicles, and the upper bolster-plate is here also provided with a recess $c$ to accommodate the head of the king-pin $d$. The king-pin $d$ has an oblong head $e$ of substantially the same shape but somewhat smaller than the recesses in the bolster-plate $b$ above noted, the head $e$ being moreover beveled at its ends as shown at $f$. The lower end of the king-pin is provided with a crank $g$ which is attached at its end by a ball-and-socket joint to the link $h$ and which is attached at its other end by a ball-and-socket joint to the rod $i$, which rod is, in turn, provided with a bent arm $k$ which is adapted to underlie the bottom of the shank of the king-pin proper. The rod $i$ is sleeved in two depending brackets $l$ and $m$ and is provided with a handle $n$ at one extremity thereof and carries a notch $o$ in which may take the spring-stop $p$, as shown in Fig. 1.

In operation it is obvious from the drawings that longitudinal movements of the rod $i$ will result in turning movements of the king-pin, whereas turning movements of the rod $i$ will result in raising or lowering the king-pin. Now supposing that the king-pin has been dropped to its lowered position as shown in Fig. 3 wherein it is shown as not engaging the upper bolster-plate, then by turning the rod $i$ the king-pin may be raised through the upper-bolster-plate until its lower edge clears the under surface of the recess $c$ (see Fig. 1). By thereafter sliding the rod $i$ to the position shown in Figs. 1 and 2, the head $e$ of the king-pin is turned across the oblong apertures of the upper bolster-plate, in which position the bolster-plates are securely locked together. The king-pin may be released from the upper bolster-plate in an obvious manner by first sliding the rod $i$ to a position wherein the head $e$ of the king-pin is alined with the opening in the upper bolster-plate $a$, when it will drop through this opening in an obvious manner. I have beveled the ends of the head of the king-pin in order that with the king-pin in its released position there may be no possibility of any interference as the tractor and the trailer are separated in the manner shown in my co-pending cases above referred to.

Having now described my invention, but recognizing that many changes and modifications may be made from the specific forms in which I have chosen here to illustrate it without departing from the scope of the invention, which is more truly bounded and defined by the claims hereto appended, I claim:—

1. In a vehicle, a pair of mutually-engageable bolster-plates one thereof provided with an unsymmetrical aperture, a king-bolt provided with a head of the same shape as said aperture, and adapted to pass therethrough, means whereby said king-bolt may be raised, lowered and turned at will, said last-named means being operable at a distance from said bolster-plates.

2. In a motor-vehicle, a pair of bolster-plates having apertures therethrough, a king-bolt having a head designed to slip through one of said apertures in one position but to be locked against withdrawal through said aperture in another position, a crank on said king-bolt, a link connected to said crank, a rod connected to said link, an arm on said rod, means for holding said rod in longitudinally-adjusted position, whereby longitudinal movements of the rod operate to turn the king-bolt on its axis and turning movements thereof operate to move the king-bolt along its axis, all for the purpose described.

3. In a combined tractor and trailer, a fifth wheel structure including bolster-plates, a coupling element for said bolster-plates adapted in one position to lock said bolster-plates together and in another position to release said bolster-plates, and means operable at a distance from said bolster-plates whereby said coupling element may be manipulated to assume and retain locking position or releasing position at will.

4. In a vehicle, a pair of mutually engageable bolster plates, one thereof provided with a rectangular aperture, a king bolt provided with a T-head of the same shape as said aperture and adapted to pass therethrough, means whereby said king bolt may be raised, lowered and turned at will, said means being operable at a distance from said bolster plates.

EDWARD O. SUTTON.

Witnesses:
HARRY W. BOWEN,
CAROLINE W. WILLIS.